(12) United States Patent
Lee et al.

(10) Patent No.: US 8,233,144 B2
(45) Date of Patent: Jul. 31, 2012

(54) IDENTIFICATION APPARATUS OF OPTICAL CABLE AND IDENTIFICATION METHOD

(75) Inventors: Bong Wan Lee, Daejeon-si (KR); Ho Jin Jeong, Daejeon-si (KR); Yun Sook Lee, Daejeon-si (KR)

(73) Assignee: Fiberpro, Inc., Daejeon (KR)

( * ) Notice: Subject to any disclaimer, the term of this patent is extended or adjusted under 35 U.S.C. 154(b) by 268 days.

(21) Appl. No.: 12/595,142

(22) PCT Filed: Apr. 4, 2008

(86) PCT No.: PCT/KR2008/001915
§ 371 (c)(1),
(2), (4) Date: Mar. 10, 2010

(87) PCT Pub. No.: WO2008/123703
PCT Pub. Date: Oct. 16, 2008

(65) Prior Publication Data
US 2011/0102773 A1 May 5, 2011

(30) Foreign Application Priority Data

Apr. 9, 2007 (KR) .................. 10-2007-0034752

(51) Int. Cl.
*G01N 21/00* (2006.01)
(52) U.S. Cl. .................................... 356/73.1
(58) Field of Classification Search .................. None
See application file for complete search history.

(56) References Cited

U.S. PATENT DOCUMENTS

| | | | | |
|---|---|---|---|---|
| 5,969,806 A * | 10/1999 | Bergano | ...... | 356/73.1 |
| 6,650,798 B2 | 11/2003 | Russell et al. | | |
| 7,764,363 B2 * | 7/2010 | Hayward et al. | ...... | 356/73.1 |

FOREIGN PATENT DOCUMENTS

| | | |
|---|---|---|
| JP | 2-230106 A | 9/1990 |
| JP | 11-166880 A | 6/1999 |
| KR | 10-2007-0023525 A | 2/2007 |

* cited by examiner

*Primary Examiner* — Tu Nguyen
(74) *Attorney, Agent, or Firm* — Drinker Biddle & Reath LLP

(57) ABSTRACT

An optical cable identification apparatus for identifying an optical cable by disturbing an optical fiber, existing inside an optical cable desired to be identified, from outside the optical cable. An optical unit transmits two optical signals to a single strand of optical fiber inside the optical cable, and detects a phase difference, a time difference, and light intensity between two optical signals which are reflected due to the disturbance from the outside. A single-fiber ending unit generates the time difference. A signal processing unit removes noise from the two reflected optical signals and demodulates the optical signals. A sound output unit outputs the optical signals from the signal processing unit as sounds.

13 Claims, 2 Drawing Sheets

[Fig. 1]
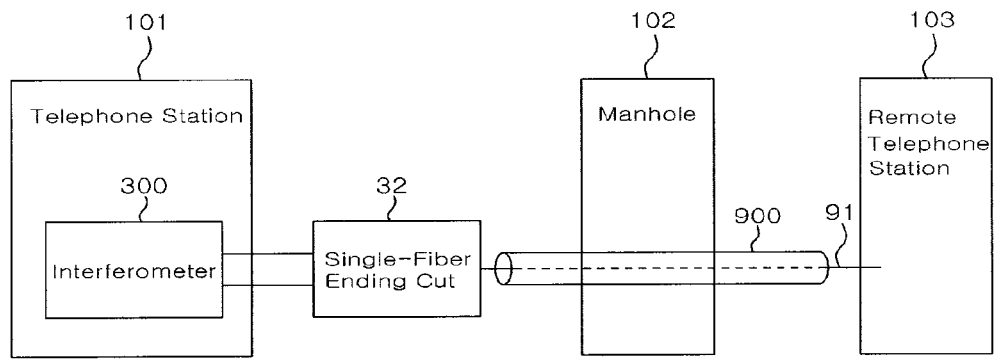
[Fig. 2]
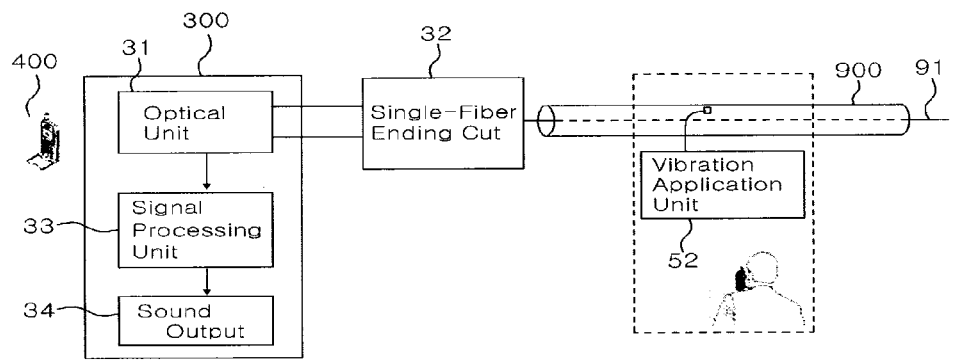
[Fig. 3]
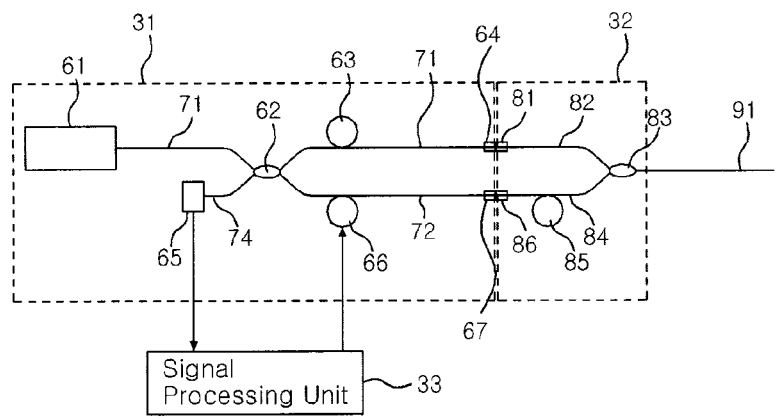

[Fig. 4]
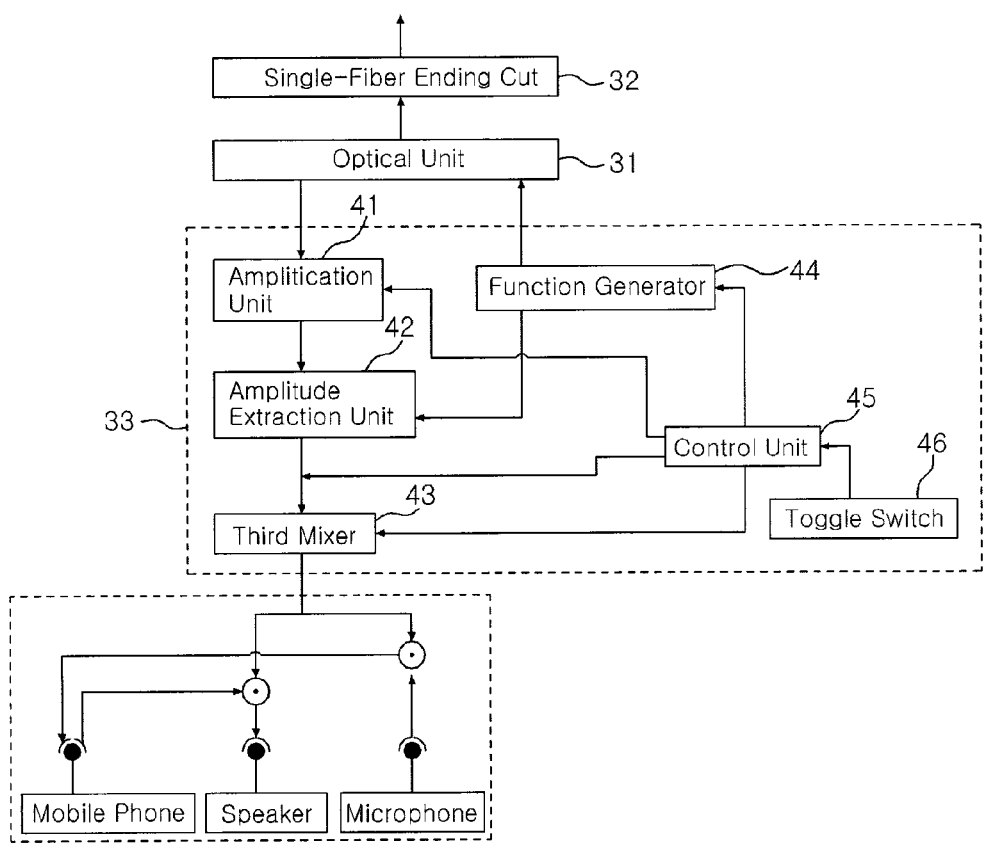

IDENTIFICATION APPARATUS OF OPTICAL CABLE AND IDENTIFICATION METHOD

CROSS-REFERENCE TO RELATED APPLICATIONS

This application is the U.S. national phase of the International Patent Application No. PCT/KR2008/001915 filed Apr. 4, 2008, which claims the benefit of Republic of Korea Application No. 10-2007-0034752, filed Apr. 9, 2007, the entire contents of which are incorporated herein by reference.

BACKGROUND

1. Field of the Invention

The present invention relates, in general, to optical cable identification, and, more particularly, to an optical cable identification apparatus and method capable of accurately identifying an optical cable from a remote location. Here, the remote location means a place, such as a manhole, which is remote from a telephone station, at which communication devices are located.

2. Description of Related Art

Generally, telephone lines or the other types of communication lines connect telephone stations, and a plurality of manholes is formed between the telephone stations so that operations, such as maintenance and modification, can be easily performed.

In reality, in the case of a manhole in which a plurality of strands of optical cables is installed, such an optical cable is often required to be divided or moved. In this case, a desired optical cable must be cut. If the cable to be worked on is misjudged, there is the possibility that a cable line being used for communication may be cut. Therefore, it is important to reliably identify a cable to be worked on before a cutting operation is performed.

In order to identify the cable to be worked on, a method of pulling a cable using physical force from an adjacent manhole and a method of using electromagnetic induction have been used. When the electromagnetic induction method is applied to identify one of optical cables, metal tension yarns capable of transmitting electricity must be included in respective cables. However, general optical cables which are currently used pose a difficulty in that they have no such tension yarn. In addition, since tension yarns passing through manholes may not be connected to one another, this method has a limitation in the distance over which it can be implemented.

In order to solve the above-described inconvenience, there is a prior art interferometer method of accurately identifying an optical cable by connecting two strands of optical fibers in a loop form. However, in this case, there is inconvenience in that two strands of optical fibers in a cable desired to be identified must be used, and in that the two strands of optical fiber must be connected to at the opposite end of the cable so as to form a loop. In particular, when an end of an optical cable or an optical fiber is not found, a loop cannot be configured, and thus the interferometer method cannot be applied.

SUMMARY

Accordingly, the present invention has been made keeping in mind the above problems occurring in the prior art, and an object of the present invention is to provide an optical cable identification apparatus and method capable of being applied to optical cables, and accurately identifying an optical cable in a remote location using only a single strand of optical fiber in an optical cable desired to be identified.

In order to solve the above problems, the present invention provides an optical cable identification apparatus for identifying an optical cable by disturbing an optical fiber, existing inside an optical cable desired to be identified, from outside, the optical cable identification apparatus including an optical unit for transmitting two optical signals to a single strand of optical fiber inside the optical cable, and detecting a phase difference, a time difference, and light intensity between two optical signals which are reflected due to the disturbance from the outside; a single-fiber ending unit for generating the time difference; a signal processing unit for removing noise from the two reflected optical signals and demodulating the optical signals; and a sound output unit for outputting the optical signals from the signal processing unit as sounds.

In the optical cable identification apparatus according to the present invention, phase modulation and the time difference are generated in any one of the two optical signals.

In the optical cable identification apparatus according to the present invention, the optical unit includes a light source generator configured to generate the optical signals; an optical detection unit connected to a first optical coupler, and configured to detect the optical signals which are reflected back and then returned; the first optical coupler configured to include a first arm connected to the light source generator and a second arm connected to a photodetector; a phase modulator configured to perform the phase modulation on input/output optical signals; and a depolarizer configured to stabilize interference optical signals by removing polarization from the input/output optical signals.

In the optical cable identification apparatus according to the present invention, the signal processing unit includes a toggle switch for selecting demodulation signals; an amplification unit for amplifying the output signals from the optical unit, and determining amplification degrees by receiving a gain value from a control unit; the control unit for performing control such that the demodulation signals corresponding to the selection of the toggle switch are output; a function generator for outputting the demodulation signals corresponding to a control signal from the control unit, and supplying uniform modulation signals from the amplification unit to an amplitude extraction unit; the amplitude extraction unit for extracting amplitude from signals output from the amplification unit, and extracting the amplitude of the components of the demodulation signals output from the function generator; and a third mixer for outputting an alarm signal if the amplitude extracted by the amplitude extraction unit is in a saturated state, combining the alarm signal with a signal from the amplitude extraction unit, and outputting the resulting signal.

In the optical cable identification apparatus according to the present invention, the control unit controls the gain of the amplification unit, determines amplitude output from the amplitude extraction unit based on continuous pressure sounds, and outputs an alarm signal if the amplitude is in a saturated state.

In the optical cable identification apparatus according to the present invention, the sound output unit includes a first jack connected to a mobile phone; a second jack connected to a speaker; a third jack connected to a microphone; a second mixer configured to transmit the output of a first mixer and the output of the mobile phone, made through the first jack, to the speaker through the second jack; and the first mixer configured to transmit the output of the second mixer and the input of the microphone, made through the third jack, to the mobile phone through the first jack.

In the optical cable identification apparatus according to the present invention, the signal processing unit delays the output of the optical signals, detected by the optical unit, for a predetermined time, and reproduces the optical signals as sound signals in order to easily discriminate between pressure sounds, generated by the disturbance from outside, and reproduction sounds, received through a communication device.

In the optical cable identification apparatus according to the present invention, the single-fiber ending unit includes a second optical coupler configured to include a fifth arm and a sixth arm; and a dummy fiber formed by extending the optical fiber to form a dummy on the sixth arm in order to generate the time difference in the optical signals.

In the optical cable identification apparatus according to the present invention, the dummy fiber is formed by an optical fiber having a length in a range from 300 to 5000 m.

In the optical cable identification apparatus according to the present invention, the single-fiber ending unit can be detachably mounted.

Further, in order to solve the above problems, the present invention provides an optical cable identification method of identifying an optical cable by disturbing an optical fiber, existing inside an optical cable desired to be identified, from outside, the optical cable identification method including the steps of connecting the second optical coupler of a single-fiber ending unit to the single strand of optical fiber of the optical cable desired to be identified; the light source generator of an optical unit transmitting two optical signals to the single strand of optical fiber; a vibration application unit or an operator at a worksite generating pressure sounds by disturbing the optical cable, desired to be identified, from outside; the optical unit detecting a phase difference, a time difference, and light intensity of two optical signals reflected due to the disturbance from outside; a signal processing unit demodulating the detected optical signals; converting the optical signals of the signal processing unit into respective sound signals, and transmitting the sound signals to a second communication device of the operator at a remote location through a first communication device in a telephone station; and repeating a process of disturbing the optical cable from outside if the sound of the first communication device is not identical to the sound of the second communication device.

In the optical cable identification method according to the present invention, phase modulation and the time difference are generated in any one of the two optical signals.

In the optical cable identification method according to the present invention, the time difference is generated in the dummy fiber of the single-fiber ending unit.

The present invention provides a device and method enabling an operator at a remote worksite, who must distinguish between optical cables and cut one of the optical cables, to easily and accurately find a desired optical cable to be worked on, so that there is an advantage in that the accident in which the wrong optical cable is cut by mistake can be prevented. Further, the present invention enables different signals to be selected depending on the state of the worksite, thereby further accurately identifying an optical cable, enables a saturation state to be determined, so that there is no need to strongly pound an optical cable without necessity.

BRIEF DESCRIPTION OF THE DRAWINGS

FIG. 1 is a diagram showing telephone stations and a manhole to which an optical cable identification apparatus according to the present invention is applied;

FIG. 2 is a diagram showing the configuration of the telephone station to which the optical cable identification apparatus according to the present invention is applied;

FIG. 3 is a diagram showing the configuration of the optical cable identification apparatus according to the present invention; and FIG. 4 is a diagram showing the configuration of the signal processing unit and sound output unit of the optical cable identification apparatus in detail.

DESCRIPTION OF REFERENCE NUMERALS OF PRINCIPAL ELEMENTS IN THE DRAWINGS

21: first mixer
22: second mixer
23: first jack
24: second jack
25: third jack
31: optical unit
32: single-fiber ending unit
33: signal processing unit
34: sound output unit
41: amplification unit
42: amplitude extraction unit
43: third mixer
44: function generator
45: control unit
46: toggle switch
52: vibration application unit
53: second communication device
400: first communication device
61: light source generator
62: first optical coupler
63: depolarizer
64: first optical connector
65: optical detection unit
66: phase modulator
67: second optical connector
81: third optical connector
83: second optical coupler
85: dummy fiber
86: fourth optical connector
101: telephone station
102: manhole
103: remote telephone station
300: interferometer
900: optical cable
71: third arm
72: fourth arm
73: first arm
74: second arm
82: fifth arm
84: sixth arm
91: optical fiber

DETAILED DESCRIPTION

An optical cable identification apparatus according to the present invention will be described in detail with reference to the attached drawings below.

FIG. 1 is a diagram showing telephone stations and a manhole to which an optical cable identification apparatus according to the present invention is applied, and FIG. 2 is a diagram showing the configuration of the telephone station to which the optical cable identification apparatus according to the present invention is applied.

With reference to FIGS. 1 and 2, an optical cable 900 of a plurality of optical cables (not shown) connects a telephone station 101 and a remote telephone station 103 through at least one manhole 102, and the optical cable 900 includes an optical fiber 91 of a plurality of optical fibers (not shown).

An end of the optical cable 900 connecting the telephone stations 101 is cut, and an interferometer 300 and a single-fiber ending unit 32, which correspond to the optical cable identification apparatus according to the present invention, are sequentially connected to the optical fiber 91 of the optical cable 900 desired to be identified at the end of the optical cable 900. The interferometer 300 includes an optical unit 31, a signal processing unit 33, and a sound output unit 34.

Here, the single-fiber ending unit 32 is connected to the optical unit 31, and is configured to generate a time difference in optical signals which flow through the optical fiber 91.

The optical unit 31 transmits two optical signals to a single strand of optical fiber 91 in the optical cable 900 desired to be identified, and then detects and outputs the phase difference, time difference, and light intensity of two optical signals reflected due to disturbance from outside, for example, application of a vibration application unit 52 to the optical cable 900 or the pounding of the optical cable 900 by an operator at a worksite.

The signal processing unit 33 is connected to an optical unit 31, and is configured to remove the noise of optical signals, to demodulate and output optical signals, the phase difference and strength of which are varied, and a time difference, and to reproduce a sound signal by delaying the output of the optical signals detected by the optical unit 31 for a predetermined time in order to easily distinguish between a disturbance signal, applied to the optical cable 900 by an operator at the worksite, and reproduction sound received through a second communication device 53.

The sound output unit 34 outputs the optical signals of the signal processing unit 33 as sound. Here, the tones of the signals are transmitted to the second communication device 53 of a remote operator through the first communication device 400 located in the telephone station, thereby identifying the optical cable 900. Here, it is preferred that a telephone or a mobile phone be used as the first communication device 400, and that a mobile phone be used as the second communication device 53.

FIG. 3 shows the optical unit, single-fiber ending unit, and signal processing unit of the optical cable identification apparatus according to the present invention.

With reference to FIG. 3, the optical unit 31 includes a light source generator 61, an optical detection unit 65, a first optical coupler 62, a depolarizer 63, a phase modulator 66, a first optical connector 64, and a second optical connector 67. The single-fiber ending unit 32 includes a third optical connector 81, a fourth optical connector 86, a dummy fiber 85, and a second optical coupler 83. The signal processing unit 33 is connected to the optical unit 31, and is configured to demodulate and output modulated optical signals, the phase difference and the strength of which are varied, and a time difference.

The light source generator 61 generates optical signals.

The optical detection unit 65 is connected to the first optical coupler 62, and is configured to detect and output optical signals which reflect back and then returns.

The first optical coupler 62 includes a first arm 73, connected to the light source generator 61, and a second arm 74, connected to a photodetector 65, and is configured to perform coupling on the optical signals of the light source generator 61.

The phase modulator 66 is connected to the fourth arm 72 of the first optical coupler 62, and is configured to perform phase modulation on input/output optical signals.

The depolarizer 63 is connected to the third arm 71 of the first optical coupler 62, and is configured to remove the polarized light of the input/output optical signals, thereby stabilizing interference optical signals.

The first and second optical connectors 64 and 67 are connected to the third and fourth optical connectors 81 and 86 of the single-fiber ending unit 32. Here, the single-fiber ending unit 32 can be installed inside or outside the interferometer 300. In the case in which the single-fiber ending unit 32 is installed outside the interferometer 300, it can be detachably mounted.

The second optical coupler 83 includes a fifth arm 82 and a sixth arm 84, and a dummy fiber 85 formed by extending the optical fiber to form a dummy on the sixth arm 84 in order to generate a time difference in the optical signals. Here, it is preferred that the dummy fiber 85 be formed to have a length in a range from 300 to 5000 m.

Here, the first to sixth arms are formed of optical fibers, and the other end of the second optical coupler 83 is connected to the optical fiber 91 of the optical cable desired to be identified.

FIG. 4 is a diagram showing the signal processing unit and sound output unit of the optical cable identification apparatus of FIG. 3 in detail.

With reference to FIG. 4, the signal processing unit includes an amplification unit 41, an amplitude extraction unit 42, a function generator 44, a control unit 45, a third mixer 43, and a toggle switch 46. The sound output unit 34 includes a first jack 23, a second jack 24, a third jack 25, a first mixer 21, and a second mixer 22.

The toggle switch 46 receives input in a toggle form so as to select demodulation signals.

Here, the toggle switch 46 may be omitted in the case in which the signals are fixed to the modulation signals.

The amplification unit 41 amplifies signals output from the optical unit 31, receives the value of gain from the control unit 45, and determines amplification degrees.

The control unit 45 performs control such that demodulation signals corresponding to the selection of the toggle switch 46 are output. Here, the control unit 45 controls the gain of the amplification unit 41, determines amplitude output from the amplitude extraction unit 42 through continuous application of pressure, and outputs an alarm signal in the case in which the amplitude is in a saturated state.

The function generator 44 outputs a demodulation signal corresponding to the control signal of the control unit 45, and supplies the uniform modulation signal of the amplification unit 41 to the amplitude extraction unit 42.

The amplitude extraction unit 42 extracts amplitude from a signal output from the amplification unit 41, and extracts the amplitude of the components of a demodulation signal output from the function generator 44.

When the amplitude of the amplitude extraction unit 42 is in a saturated state, the third mixer 43 outputs an alarm signal, and combines and outputs the alarm signal with the signal from the amplitude extraction unit 42.

The second mixer 22 transmits the output of the first mixer 21 and the output of the first communication device, made through the first jack 23, to a speaker through the second jack 24.

The first mixer 21 transmits the output of the third mixer 43 and the input of a microphone, made through the third jack 25, to a mobile phone through the first jack 23.

The first jack 23 is connected to the mobile phone and inputs/outputs data, and the second jack 24 transmits the output of the second mixer 22 to the speaker so that sound is output.

The third jack 25 receives the output of the microphone and transmits it to the first mixer 21.

An optical cable identification method will be described in detail using the optical cable identification apparatus according to the present invention having the above-described configuration, below.

In the optical cable identification method using the optical cable identification apparatus according to the present invention, the single-fiber ending unit 32 is first connected to the optical unit 31 of an interferometer.

Thereafter, the second optical coupler 83 of the single-fiber ending unit 32 is connected to the single strand of optical fiber 91 desired to be identified in an optical cable.

Thereafter, the light source generator 61 of the optical unit 31 transmits a first optical signal (A, B, C, and D) and a second optical signal (A, E, C, and D) to a single strand of optical fiber 91. Here, the phase of the second optical signal (A, E, C, and D) is modulated by the phase modulator 66, and a time difference is generated between the second optical signal (A, E, C, and D) and the first optical signal (A, B, C, and D) by the dummy fiber 85.

Thereafter, pressure sounds is generated by connecting the vibration application unit 52 to the optical cable that is desired to be identified, or is generated by disturbing the exterior of the optical cable by an operator at the worksite.

Subsequently, in the optical fiber 91, due to the disturbance from outside, the first optical signal (A, B, C, and D) is reflected in the form of a third signal (D, C, E, and F) and is then returned, and the second optical signal (A, E, C, and D) is reflected in the form of a fourth optical signal (D, C, E, and F) and is then returned. Here, a time difference is generated between the third optical signal (D, C, E, and F) and the fourth optical signal (D, C, E, and F) through the dummy fiber 85, and the phases thereof are modulated by the phase modulator 66.

Thereafter, the optical detection unit 65 detects the time difference, phase difference, and light intensity of each of the third and fourth optical signals which are reflected and then returned, and the detected optical signals are demodulated by the signal processing unit. Here, the reflected light intensity is amplified by the disturbance from outside.

At last, the optical signals of the signal processing unit are converted into respective sounds, and the sounds are transmitted to the second communication device 53 of a remote operator through the first communication device 400 in the telephone station.

Here, if the sound heard through the first communication device 400 is identical to the sound heard through the second communication device 53, it is determined that the operator has selected the desired optical cable 900. Otherwise, a process of disturbing the optical cable from outside is repeated so as to identify the optical cable 900.

It is preferred that the light source of the optical unit 31 be a light source having a wide line width of a communication band of 1550 nm, and Amplified Spontaneous Emission (ASE) or Super Luminescent Diode (SLD) light source using Erbium Doped Fiber (EDF) may be the example of the light source.

When a light source (for example, an SLD), included in the polarization components from among such light sources, is used, it is preferred to additionally use a depolarizer capable of reducing the polarization degree of the light source at one end of the light source. In the case of the ASE light source, an additional depolarizer is not required because it is in a non-polarized state.

Although the preferred embodiment of the present invention has been disclosed in the mode of the invention as described above, those skilled in the art will appreciate that various modifications are possible without departing from the scope of the invention. Therefore, it will be apparent that the scope of the patent rights of the present invention is not determined by the above-described embodiment, but encompasses all equivalents as well as the claims.

The present invention is related to optical cable identification, and, in particular, to an optical cable identification apparatus and method capable of accurately identifying an optical cable from a remote location. With the increase in the demand for the Internet and network communication, the necessity to install and manage an optical cable has increased.

The invention claimed is:

1. An optical cable identification apparatus for identifying an optical cable by disturbing an optical fiber, existing inside an optical cable desired to be identified, from outside the optical cable, the optical cable identification apparatus comprising:
   an optical unit for transmitting two optical signals to a single strand of optical fiber inside the optical cable, and detecting a phase difference, a time difference, and light intensity between two optical signals which are reflected due to the disturbance from the outside;
   a single-fiber ending unit for generating the time difference;
   a signal processing unit for removing noise from the two reflected optical signals and demodulating the optical signals; and
   a sound output unit for outputting the optical signals from the signal processing unit as sounds.

2. The optical cable identification apparatus according to claim 1, wherein phase modulation and the time difference are generated in any one of the two optical signals.

3. The optical cable identification apparatus according to claim 1, wherein the optical unit comprises:
   a light source generator configured to generate the optical signals;
   an optical detection unit connected to a first optical coupler, and configured to detect the optical signals which are reflected back and then returned;
   the first optical coupler configured to include a first arm connected to the light source generator and a second arm connected to a photodetector;
   a phase modulator configured to perform the phase modulation on input/output the optical signals; and
   a depolarizer configured to stabilize interference optical signals by removing polarization from the input/output optical signals.

4. The optical cable identification apparatus according to claim 1, wherein the signal processing unit comprises:
   a toggle switch for selecting demodulation signals;
   an amplification unit for amplifying the output signals from the optical unit, and determining amplification degrees by receiving a gain value from a control unit;
   the control unit for performing control such that the demodulation signals corresponding to the selection of the toggle switch are output;
   a function generator for outputting the demodulation signals corresponding to a control signal from the control unit, and supplying uniform modulation signals from the amplification unit to an amplitude extraction unit;

the amplitude extraction unit for extracting amplitude from signals output from the amplification unit, and extracting amplitude of components of the demodulation signals output from the function generator; and a third mixer for outputting an alarm signal if the amplitude extracted by the amplitude extraction unit is in a saturated state, combining the alarm signal with a signal from the amplitude extraction unit, and outputting the resulting signal.

5. The optical cable identification apparatus according to claim 4, wherein the control unit controls gain of the amplification unit, determines amplitude output from the amplitude extraction unit based on continuous pressure sounds, and outputs an alarm signal if the amplitude is in a saturated state.

6. The optical cable identification apparatus according to claim 1, wherein the sound output unit comprises:
   a first jack connected to a mobile phone;
   a second jack connected to a speaker;
   a third jack connected to a microphone;
   a second mixer configured to transmit output of a first mixer and output of the mobile phone, made through the first jack, to the speaker through the second jack; and
   the first mixer configured to transmit output of the second mixer and input of the microphone, made through the third jack, to the mobile phone through the first jack.

7. The optical cable identification apparatus according to claim 1, wherein the signal processing unit delays output of the optical signals, detected by the optical unit, for a predetermined time, and reproduces the optical signals as sound signals in order to easily discriminate between pressure sounds, generated by the disturbance from the outside, and reproduction sounds, received through a communication device.

8. The optical cable identification apparatus according to claim 1, wherein the single-fiber ending unit comprises:
   a second optical coupler configured to include a fifth arm and a sixth arm; and
   a dummy fiber formed by extending the optical fiber to form a dummy on the sixth arm in order to generate the time difference in the optical signals.

9. The optical cable identification apparatus according to claim 8, wherein the dummy fiber is formed by an optical fiber having a length in a range from 300 to 5000 m.

10. The optical cable identification apparatus according to claim 1, wherein the single-fiber ending unit can be detachably mounted.

11. A method of identifying an optical cable by disturbing an optical fiber, existing inside an optical cable desired to be identified, from outside the optical cable, the optical cable identification method comprising the steps of:
   connecting a second optical coupler of a single-fiber ending unit to a single strand of optical fiber of the optical cable desired to be identified;
   a light source generator of an optical unit transmitting two optical signals to the single strand of optical fiber;
   a vibration application unit or an operator at a worksite generating pressure sounds by disturbing the optical cable, desired to be identified, from the outside;
   the optical unit detecting a phase difference, a time difference, and light intensity of two optical signals reflected due to the disturbance from the outside;
   a signal processing unit demodulating the detected optical signals;
   converting the optical signals of the signal processing unit into respective sound signals, and transmitting the sound signals to a second communication device of the operator at a remote location through a first communication device in a telephone station; and
   repeating a process of disturbing the optical cable from the outside if a sound of the first communication device is not identical to a sound of the second communication device.

12. The method according to claim 11, wherein phase modulation and the time difference are generated in any one of the two optical signals.

13. The method according to claim 12, wherein the time difference is generated in a dummy fiber of the single-fiber ending unit.

* * * * *